Dec. 4, 1923.

G. STELLING

DIFFERENTIAL MECHANISM

Filed Dec. 1, 1920

1,476,379

INVENTOR.
GUSTAF STELLING
BY A. B. Bowman
ATTORNEY

Patented Dec. 4, 1923.

1,476,379

UNITED STATES PATENT OFFICE.

GUSTAF STELLING, OF DEL MAR, CALIFORNIA.

DIFFERENTIAL MECHANISM.

Application filed December 1, 1920. Serial No. 427,534.

*To all whom it may concern:*

Be it known that I, GUSTAF STELLING, a citizen of the United States, residing at Del Mar, in the county of San Diego and State of California, have invented certain new and useful Differential Mechanism, of which the following is a specification.

My invention relates to differential mechanism more particularly adapted for use in connection with trucks, tractors or the like and the objects of my invention are: first, to provide a novelly constructed differential mechanism for trucks, tractors or for heavy duty work; second, to provide a differential mechanism of this class which is shiftable for connecting or disconnecting the power with either or both of the traction wheels as desired, which is positive in its engaging or connecting position; third, to provide a differential mechanism of this class in which a two-piece axle is used with reinforcing means for reinforcing the axle at their inner ends; fourth, to provide a differential mechanism of this class in which there are no friction surfaces to burn out or get out of order, and fifth, to provide a differential mechanism of this class which is simple and economical of construction, durable, easy to operate, easy to install, positive in its action and which will not readily deteriorate or get out of order.

Figure 1:
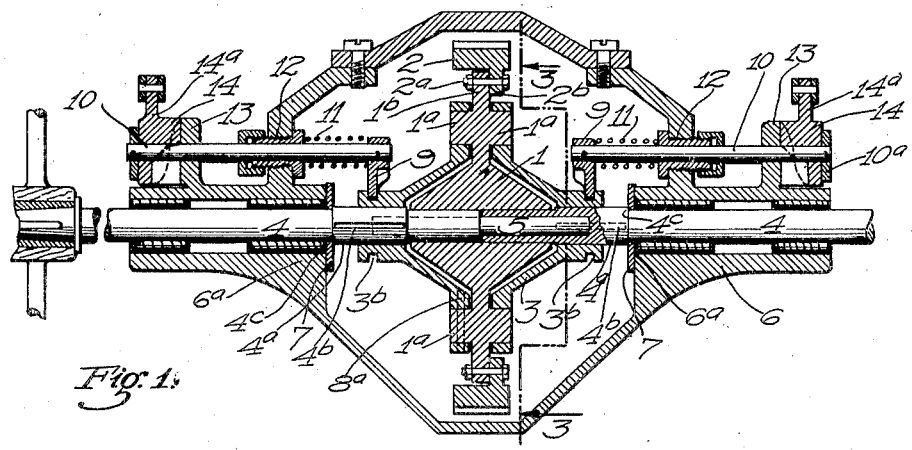
Figure 2:
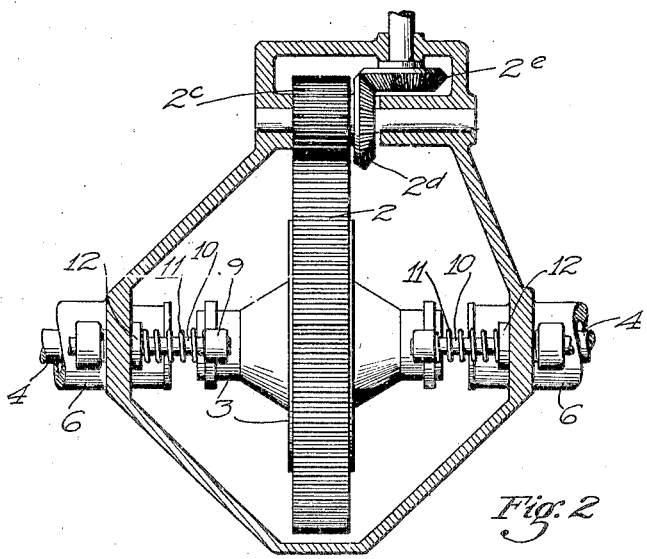
Figure 3:
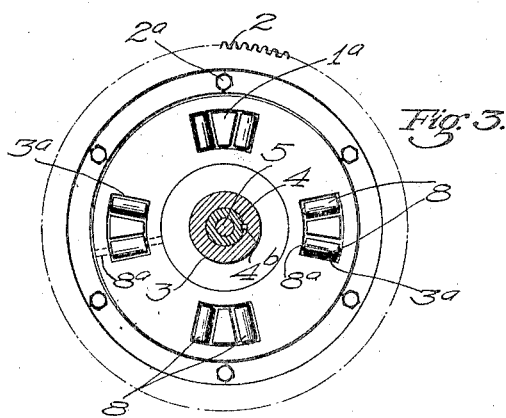

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal sectional view of my differential mechanism showing some of the parts in elevation to facilitate the illustration; Fig. 2 is a top or plan view of a fragmentary portion thereof with the casing removed; and Fig. 3 is a sectional view through 3—3 of Fig. 1.

Similar characters of reference refer to similar parts and portions throughout the several views of the drawings.

The master gear supporting member 1, gear member 2, shiftable members 3, axle members 4, axle support 5, casing 6, washers 7, rollers 8, shifting yokes 9, shafts 10, springs 11, stuffing boxes 12, stationary cam members 13 and shiftable cam members 14 constitute the principal parts and portions of my differential mechanism.

The axle consists of two members 4 placed end to end and each is provided with a hole in its inner end in which is mounted a small round shaft 5 and revoluble therein for supporting the two inner ends of the shafts in their relative relation to each other. These shafts 4 are provided with enlarged portions $4^a$ in which are mounted the keys $4^b$ which serve for supporting the shiftable members 3 on the shaft and prevent their turning relatively to said shaft but permit them to shift longitudinally thereon. These shiftable members 3 are provided with angular and outwardly extending flanges on the outer edges of which are provided openings $3^a$ in the opposite side of which are mounted pins $8^a$ which serve as axles for the rollers 8, one on each side of each opening $3^a$. It will be noted that there may be any number of these openings with rollers therein. In this case, I have shown four in each one of the members 3. Revolubly mounted on the axles 4 on the reduced inner end of said axles is the supporting hub member 1 which is provided with a long bearing surface as shown best in Fig. 1 of the drawings and its ends are adapted to engage a shoulder on the inner ends of the enlarged portions $4^a$. This member 1 extends outwardly between the two extended flanges of the members 3 and is provided on each side with outwardly extending lugs $1^a$ which are adapted to rest between each pair of rollers in the openings $3^a$ when the member 3 is in connecting engagement with the master gear. Secured on the outer edge of the flange portion $1^b$ of the member 1 is the gear member 2, by means of a plurality of bolts $2^a$ secured through the flange $2^b$ and said flange $1^b$ on the member 1. This gear 2 meshes with a pinion $2^c$ which connects with the driving shaft by means of bevel gears $2^d$ and $2^e$. Each of the members 3 is provided with a groove $3^b$ near its outer end which is adapted for the yokes 9 secured on the ends of the shafts 10. These shafts 10 are shiftably mounted in stuffing boxes 12 secured in the casing 6 adjacent the axles 4.

It will be here noted that the casing 6 performs the function of supporting the axles 4, shafts 10 and forming a housing for the differential mechanism and is grease tight for forming a receptacle for lubricating the internal differential mechanism. Mounted between the stuffing boxes 12 and the yokes 9 are compression springs 11 tending to hold the shafts 10 inwardly thereby holding the shiftable members 3 in engagement. The casing 1 is provided around the shaft 10 near its outer ends with cam members 13 and revolubly mounted on the shaft is a shiftable cam member 14 which is adapted to engage said member 13 and secured on the extended ends of the shafts 10 are collars 10ª which are adapted to be engaged by the members 14 for shifting the shafts 10 outwardly, compressing the springs 11 and throwing the members 3 out of engagement with the steel lug members 1ª so that the member 3 will not be engaged by the master gear support thus disconnecting the power from the wheel which is secured on the outer ends of the axles 4. Each of the members 14 are provided with arms 14ª which connect with rods which extend forwardly and are operated separately. It will be noted that the casing 6 is provided with supporting portions 6ª in a position adjacent the enlarged portion 4ª of the axles 4 and mounted therein are steel washers 7 which rest against the shoulders 4ᶜ, forming the enlarged portions 4ª of the axles 4 to prevent shifting of said axles and the housing is provided with roller bearings between these washers 7 and the outer ends of the axles for supporting the axles.

Though I have shown and described a particular construction, combination and arrangement of parts and portions, I do not wish to be limited to this particular construction, combination and arrangement, but desire to include in the purview of my invention the construction, combination and arrangement substantially as set forth in the appended claims.

It is obvious that with this construction there is provided a differential mechanism for trucks, tractors and like heavy duty work in which either or both of the traction wheels disconnect from or connect to the drive shaft; that when in engaged position, the action is positive and not frictional engagement; that the rollers 3ª are engaged by members 1ª and when the members 1ª reach the proper position, the springs 11 will force the member 3 inwardly so that the member 1ª protrudes between the rollers 8 in the openings 3ª thus providing a positive connection of the members 3ª with the master gear support; that the members 3 on opposite sides may be shifted simultaneously or separately as desired; that the inner ends of the axles 4 are connected by means of a small shaft 5 for rigidly connecting them in their relation to each other; that the structure as a whole is simple and economical of construction, compact in form, easy to operate, positive in its action and will not readily deteriorate or get out of order.

Having thus described my invention what I claim as new and desire to secure by Letters Patent is:

1. A differential mechanism, including a pair of shafts positioned end to end in alignment with each other, a gear member revolubly mounted on the adjacent ends of said shafts, a member shiftably mounted on one of said shafts provided with means to prevent its torsional movement on said shaft, lugs and recess means adapted to positively connect said gear and shiftable member, means for shifting said shiftable member into and out of engagement with said revoluble member, and a pair of rollers in connection with said lugs and recess means adapted to facilitate their connection with each other.

2. A differential mechanism, including a pair of axle members placed end to end, a gear revolubly mounted on the inner ends of both of said axles, lugs secured on said gear member, means keyed to each of said axles and shiftable thereon adapted to engage said lugs, comprising flange members provided with a plurality of openings in its sides and a pair of rollers positioned in spaced relation in each of said openings.

3. In a differential mechanism, the combination of a pair of shafts positioned end to end in alinement with each other, a gear member revolubly mounted on said shafts provided with projecting portions, a member shiftably mounted on one of said shafts provided with means to prevent its tortional movement on said shaft provided with an opening adapted to engage the projecting portions of said gear member and means for shifting said shiftable member into and out of engagement with said revoluble member.

4. In a differential mechanism, the combination of a pair of shafts positioned end to end in alinement with each other, a gear member revolubly mounted on said shafts provided with projecting portions and a member shiftably mounted on one of said shafts provided with an opening adapted to engage the projecting portions of said gear member, means for shifting said shiftable member into and out of engagement with said revoluble member, and additional means for supporting the adjacent ends of said shafts in certain relative positions to each other.

In testimony whereof I have hereunto set my hand at San Diego, California, this 24th day of November, 1920.

GUSTAF STELLING.